US012659761B2

(12) United States Patent
De Andrade et al.

(10) Patent No.: US 12,659,761 B2
(45) Date of Patent: Jun. 16, 2026

(54) MITIGATING MOBILE MONITORING DEVICE EXCESS NETWORK UTILIZATION

(71) Applicant: AT&T Intellectual Property I, L.P., Atlanta, GA (US)

(72) Inventors: Carlos Eduardo De Andrade, Gainesville, FL (US); Cheuk Yiu Ip, Metuchen, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 666 days.

(21) Appl. No.: 17/656,865

(22) Filed: Mar. 28, 2022

(65) Prior Publication Data

US 2023/0308901 A1    Sep. 28, 2023

(51) Int. Cl.
*H04W 24/02*         (2009.01)
*H04W 16/22*         (2009.01)
*H04W 24/08*         (2009.01)

(52) U.S. Cl.
CPC ........... *H04W 24/02* (2013.01); *H04W 16/22* (2013.01); *H04W 24/08* (2013.01)

(58) Field of Classification Search
CPC ......... H04L 43/00; H04L 43/12; H04L 43/14; H04L 43/16; H04L 43/18; H04L 43/0876; H04L 43/0882; H04L 43/0888; H04L 43/0894; H04L 41/50; H04L 41/5003; H04L 41/5009; H04L 41/5012; H04L 41/5016; H04L 41/5019; H04L 41/5025

See application file for complete search history.

(56) References Cited

U.S. PATENT DOCUMENTS

| | | | |
|---|---|---|---|
| 8,203,954 B1 * | 6/2012 | Patel | H04L 43/0864 |
| | | | 370/359 |
| 10,873,670 B1 | 12/2020 | Schrenkel et al. | |
| 2014/0143395 A1 | 5/2014 | Geltner et al. | |
| 2017/0019315 A1 | 1/2017 | Tapia et al. | |
| 2020/0304364 A1 | 9/2020 | Tapia et al. | |
| 2021/0168147 A1 * | 6/2021 | Gupta | H04L 63/1425 |
| 2022/0191683 A1 | 6/2022 | Shah | |

* cited by examiner

*Primary Examiner* — Diana J. Cheng

(57) ABSTRACT

A processing system including at least one processor may identify an excess utilization of a telecommunication network by a plurality of mobile monitoring devices. The plurality of mobile monitoring devices may be of a same mobile monitoring device type. In addition, the plurality of mobile monitoring devices may be associated with a plurality of users and wherein a primary function of the plurality of mobile monitoring devices is inaccessible to control by the plurality of users. The processing system may then determine that the excess utilization is not caused by the primary function of the plurality of mobile monitoring devices and perform at least one remedial action in response to the detecting of the excess utilization that is not caused by the primary function of the plurality of mobile monitoring devices.

20 Claims, 4 Drawing Sheets

300

START ⟋305

OBTAIN UTILIZATION METRICS ASSOCIATED WITH A UTILIZATION OF A TELECOMMUNICATION NETWORK BY A PLURALITY OF MOBILE MONITORING DEVICES ⟋310

OBTAIN A REQUEST TO TRACK A NETWORK UTILIZATION OF THE PLURALITY OF MOBILE MONITORING DEVICES ⟋320

APPLY AN INPUT DATA SET COMPRISING THE UTILIZATION METRICS TO AT LEAST ONE MACHINE LEARNING MODEL (MLM) IMPLEMENTED BY THE PROCESSING SYSTEM ⟋330

IDENTIFY AN EXCESS UTILIZATION OF THE TELECOMMUNICATION NETWORK BY THE PLURALITY OF MOBILE MONITORING DEVICES ⟋340

DETERMINE THAT THE EXCESS UTILIZATION IS NOT CAUSED BY THE PRIMARY FUNCTION OF THE PLURALITY OF MOBILE MONITORING DEVICES ⟋350

PERFORM AT LEAST ONE REMEDIAL ACTION IN RESPONSE TO THE DETECTING OF THE EXCESS UTILIZATION THAT IS NOT CAUSED BY THE PRIMARY FUNCTION OF THE PLURALITY OF MOBILE MONITORING DEVICES ⟋360

RECEIVE A REQUEST FROM AT LEAST ONE OF AN OPERATOR OR A MANUFACTURER OF THE PLURALITY OF MOBILE MONITORING DEVICES TO IMPOSE AT LEAST ONE ADDITIONAL REMEDIAL ACTION VIA THE TELECOMMUNICATION NETWORK ⟋370

IMPLEMENT THE AT LEAST ONE ADDITIONAL REMEDIAL ACTION IN RESPONSE TO THE REQUEST ⟋380

END ⟋395

FIG. 2
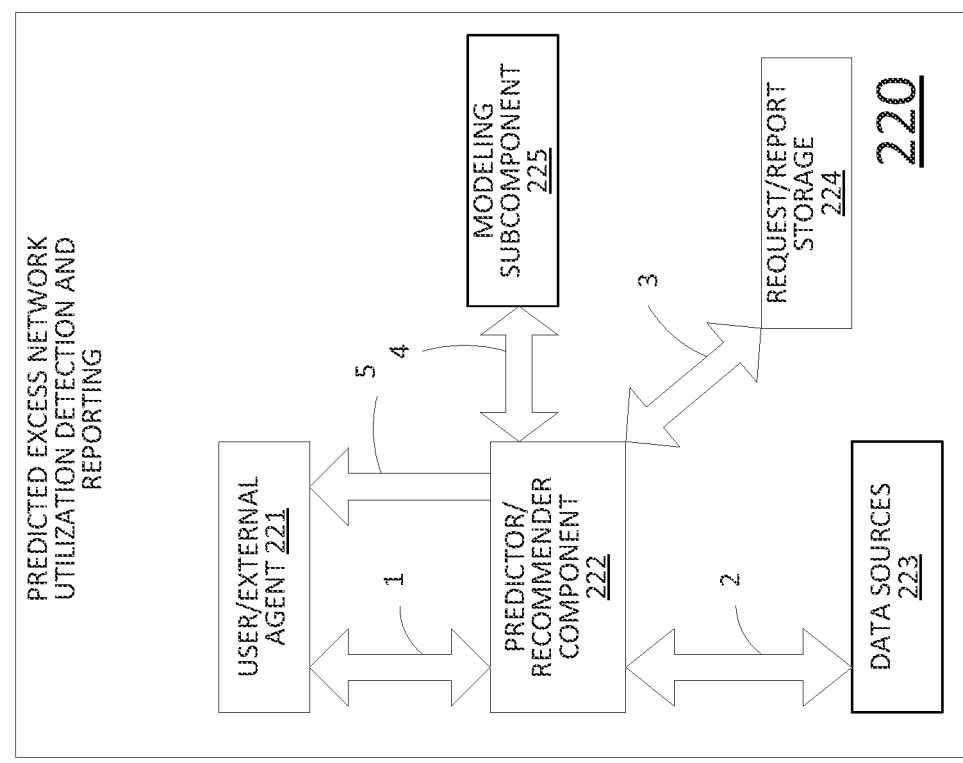
PREDICTED EXCESS NETWORK UTILIZATION DETECTION AND REPORTING
MODELING SUBCOMPONENT 225
USER/EXTERNAL AGENT 221
PREDICTOR/ RECOMMENDER COMPONENT 222
REQUEST/REPORT STORAGE 224
DATA SOURCES 223
220
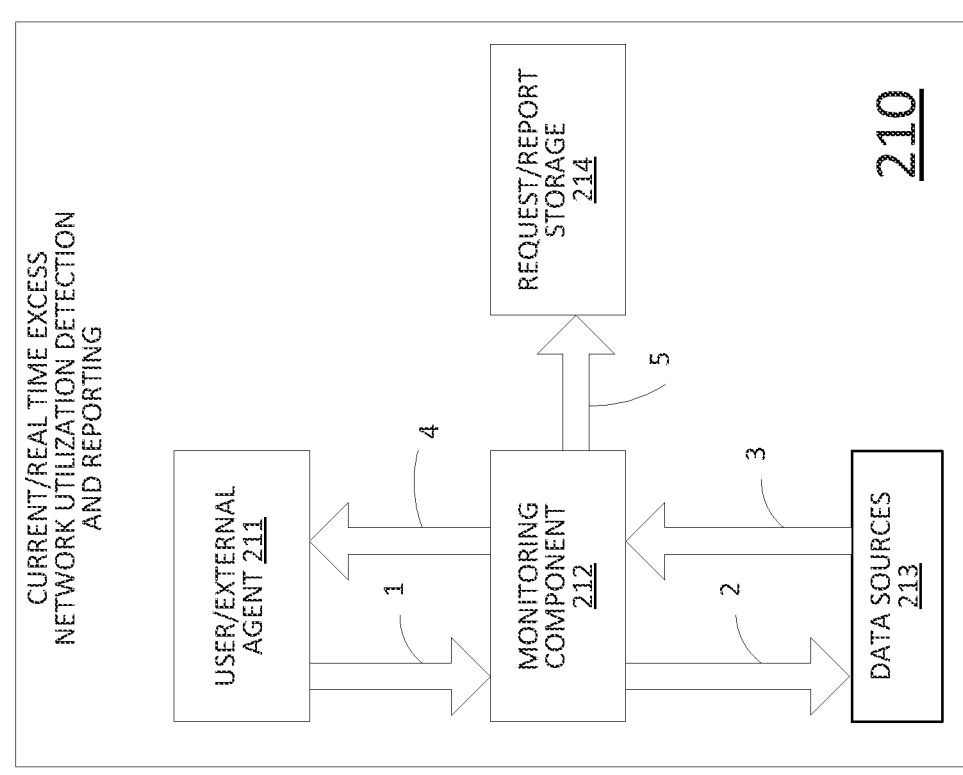
CURRENT/REAL TIME EXCESS NETWORK UTILIZATION DETECTION AND REPORTING
REQUEST/REPORT STORAGE 214
USER/EXTERNAL AGENT 211
MONITORING COMPONENT 212
DATA SOURCES 213
210

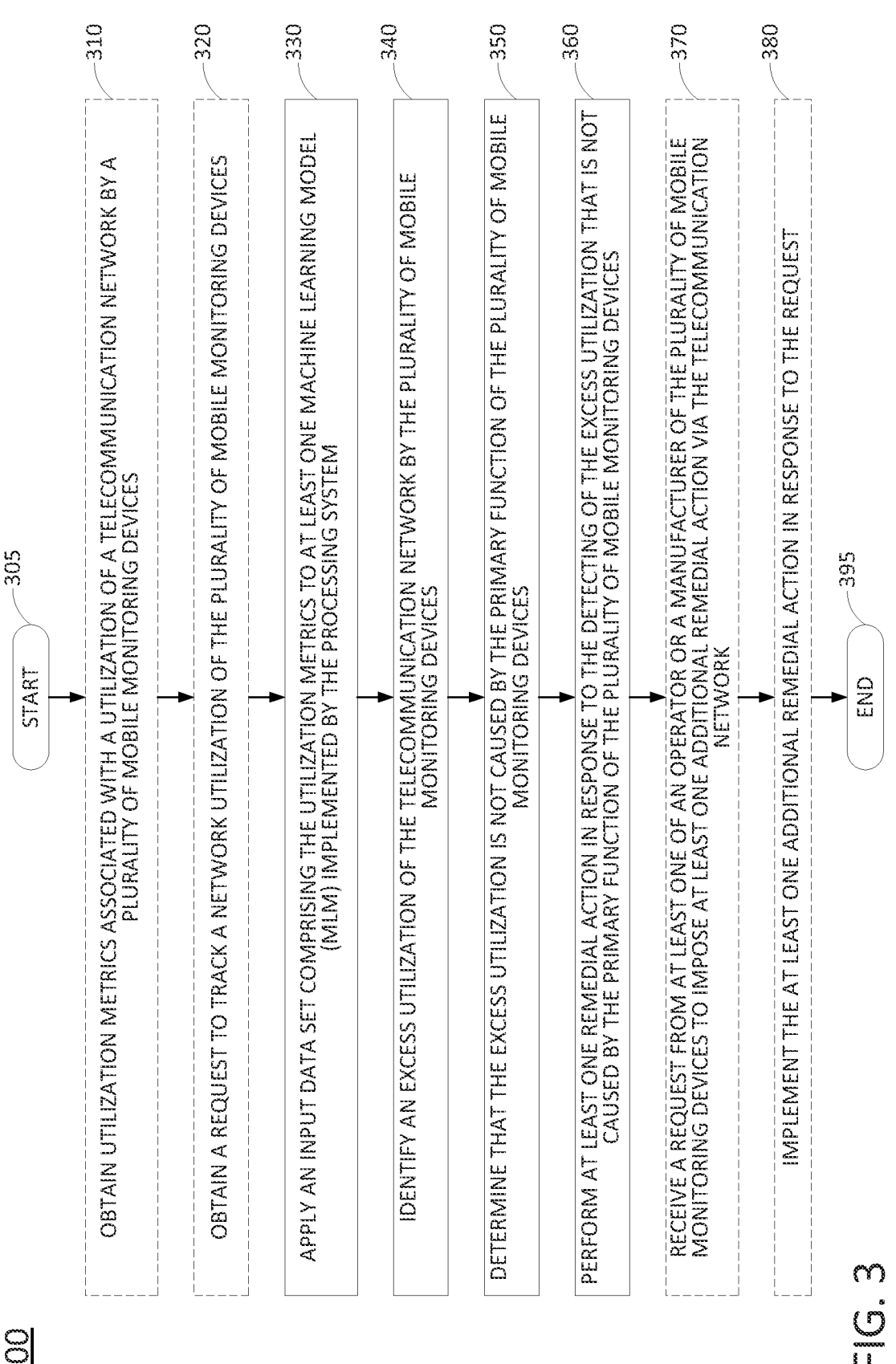

300

START (305)

OBTAIN UTILIZATION METRICS ASSOCIATED WITH A UTILIZATION OF A TELECOMMUNICATION NETWORK BY A PLURALITY OF MOBILE MONITORING DEVICES (310)

OBTAIN A REQUEST TO TRACK A NETWORK UTILIZATION OF THE PLURALITY OF MOBILE MONITORING DEVICES (320)

APPLY AN INPUT DATA SET COMPRISING THE UTILIZATION METRICS TO AT LEAST ONE MACHINE LEARNING MODEL (MLM) IMPLEMENTED BY THE PROCESSING SYSTEM (330)

IDENTIFY AN EXCESS UTILIZATION OF THE TELECOMMUNICATION NETWORK BY THE PLURALITY OF MOBILE MONITORING DEVICES (340)

DETERMINE THAT THE EXCESS UTILIZATION IS NOT CAUSED BY THE PRIMARY FUNCTION OF THE PLURALITY OF MOBILE MONITORING DEVICES (350)

PERFORM AT LEAST ONE REMEDIAL ACTION IN RESPONSE TO THE DETECTING OF THE EXCESS UTILIZATION THAT IS NOT CAUSED BY THE PRIMARY FUNCTION OF THE PLURALITY OF MOBILE MONITORING DEVICES (360)

RECEIVE A REQUEST FROM AT LEAST ONE OF AN OPERATOR OR A MANUFACTURER OF THE PLURALITY OF MOBILE MONITORING DEVICES TO IMPOSE AT LEAST ONE ADDITIONAL REMEDIAL ACTION VIA THE TELECOMMUNICATION NETWORK (370)

IMPLEMENT THE AT LEAST ONE ADDITIONAL REMEDIAL ACTION IN RESPONSE TO THE REQUEST (380)

END (395)

MITIGATING MOBILE MONITORING DEVICE EXCESS NETWORK UTILIZATION

The present disclosure relates generally to network-connected sensor devices, and more particularly to methods, computer-readable media, and apparatuses for performing at least one remedial action in response to detecting an excess utilization of a telecommunication network by a plurality of mobile monitoring devices that is not caused by the primary function of the plurality of mobile monitoring devices.

BACKGROUND

Current trends in wireless technology are leading towards a future where virtually any object can be network enabled and Internet Protocol (IP) addressable. The pervasive presence of wireless networks, including cellular, Wi-Fi, Zig-Bee, satellite and Bluetooth networks, and the migration to a 128-bit IPv6-based address space provides the tools and resources for the paradigm of the Internet of Things (IoT) to become a reality. In addition, ubiquitous use of various monitoring devices, or sensor devices is increasingly prevalent. These sensor devices may relate to biometric data, environmental data, premises monitoring, and so on.

SUMMARY

In one example, the present disclosure describes a method, computer-readable medium, and apparatus for performing at least one remedial action in response to detecting an excess utilization of a telecommunication network by a plurality of mobile monitoring devices that is not caused by the primary function of the plurality of mobile monitoring devices. For example, a processing system including at least one processor may identify an excess utilization of a telecommunication network by a plurality of mobile monitoring devices. The plurality of mobile monitoring devices may be of a same mobile monitoring device type. In addition, the plurality of mobile monitoring devices may be associated with a plurality of users and wherein a primary function of the plurality of mobile monitoring devices is inaccessible to control by the plurality of users. The processing system may then determine that the excess utilization is not caused by the primary function of the plurality of mobile monitoring devices and perform at least one remedial action in response to the detecting of the excess utilization that is not caused by the primary function of the plurality of mobile monitoring devices.

BRIEF DESCRIPTION OF THE DRAWINGS

The teachings of the present disclosure can be readily understood by considering the following detailed description in conjunction with the accompanying drawings, in which:

FIG. 2 illustrates examples of current/real-time excess network utilization detection and reporting, and predicted excess network utilization detection and reporting, in accordance with the present disclosure;

FIG. 3 illustrates a flowchart of an example method for performing at least one remedial action in response to detecting an excess utilization of a telecommunication network by a plurality of mobile monitoring devices that is not caused by the primary function of the plurality of mobile monitoring devices.

To facilitate understanding, identical reference numerals have been used, where possible, to designate identical elements that are common to the figures.

DETAILED DESCRIPTION

Figure 1:
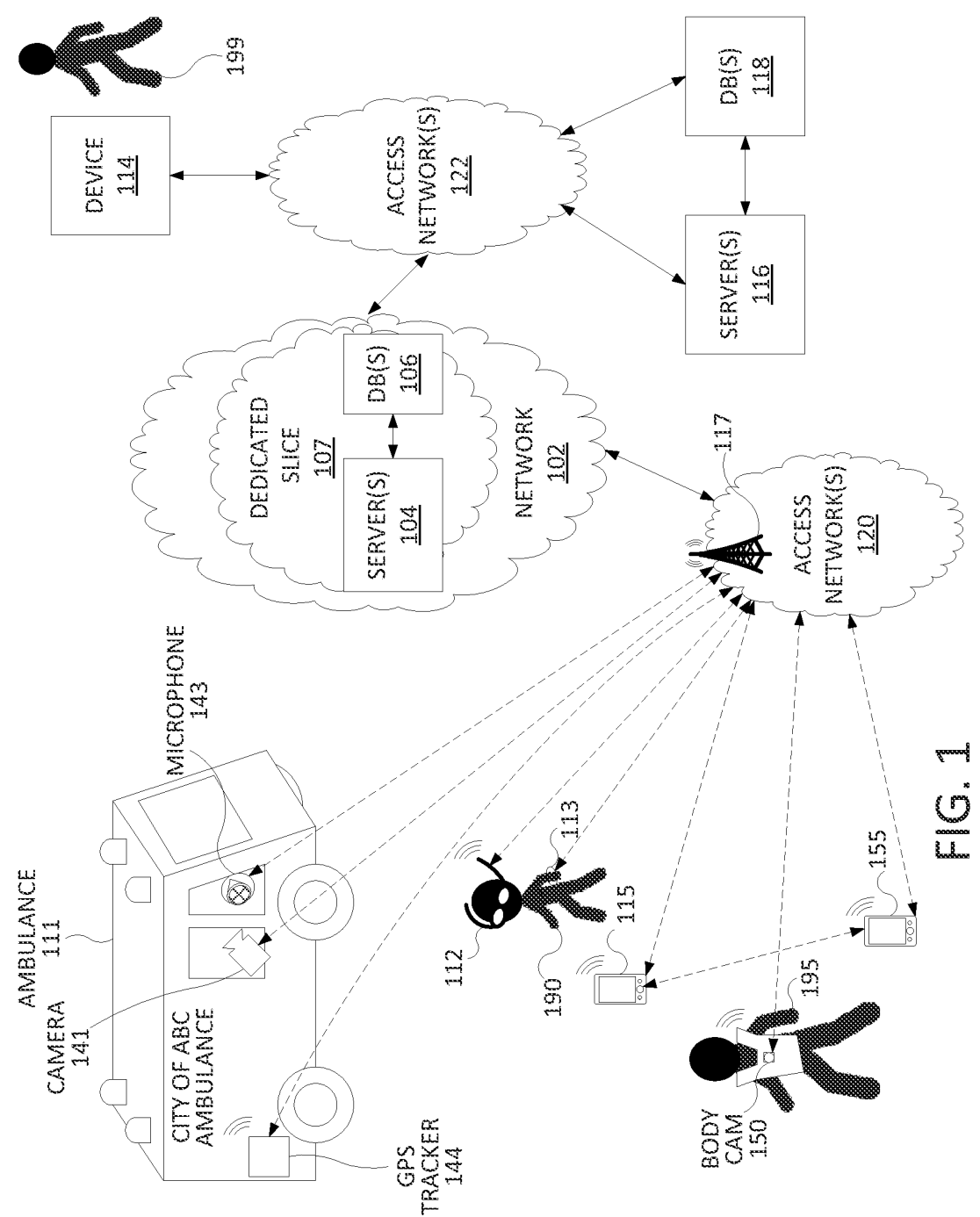
FIG. 1 illustrates an example network related to the present disclosure.

Examples of the present disclosure provide for methods, computer-readable media, and apparatuses for performing at least one remedial action in response to detecting an excess utilization of a telecommunication network by a plurality of mobile monitoring devices that is not caused by the primary function of the plurality of mobile monitoring devices. In particular, examples of the present disclosure relate to Internet of Things (IoT) devices, e.g., monitoring and/or sensor devices. For instance, the term Internet of Things (IoT) generally comprises millions of low-power/low-bandwidth consumption network-connected devices, which may generally be tailored to specific tasks. IoT device connections may be metered and may also use one or more dedicated network slices to provide, inter alia: scalability (e.g., thousands of monitoring devices deployed in the field), priority and high availability (e.g., for first-responder equipment and/or fleet tracking, medical monitoring devices, and the like), and security (e.g., the network slice(s) is/are segregated from network slice(s) for general user traffic and may run special security modes; in addition, (security) software updates may be frequent).

Since the number of IoT devices using a telecommunication network can be very large, there is a reasonable probability of a small set of devices being faulty and/or otherwise causing excessive utilization of the telecommunication network. Such excessive utilization may lead to substantial overcharges to users, e.g., subscribers. For instance, a city fleet manager may generally expect to pay a certain amount per month for vehicle fleet tracking with GPS trackers. However, in a given month, due to devices malfunctioning, the fleet manager may see a charge that is many times the expected amount. In addition, such excessive utilization may also cause network capacity drainage. For instance, priority network slices can be saturated with high and unexpected utilization. For example, the malfunctioning of IoT devices of one entity using the priority network slice(s) can cause blocking or other negative effects for IoT devices of another entity also assigned to use the same priority network slice(s). Moreover IoT devices may be compromised and may be co-opted for possible denial-of-service (DOS) attacks, or other attacks that may be characterized by network saturation and the inability of other correctly configured and correctly performing IoT devices to communicate.

In this regard, examples of the present disclosure promptly identify offender devices and implement mitigating actions in consideration of the scope and scale of affected IoT devices. Examples of the present disclosure may include either or both of two modes of operation, e.g., real-time and predicted infractions. For instance, in one example, the present disclosure may monitor for current infractor IoT devices according to one or more criteria described in greater detail below. Alternatively, or in addition, in another mode of operation the present disclosure may predict future offender devices. In such case, the present disclosure may also recommend or suggest one or more mitigation actions, or may automatically apply one or more mitigation actions, or remedial actions. In either case, examples of the present disclosure may use device-level tracking and monitoring, leveraging data from connection and usage history, network conditions, weather and other hazard issues, and general and popular calendars (e.g., showing holidays, major sports events, entertainment events, and political events) to identify offender IoT devices and/or to predict future offender IoT devices.

In one example, due to a large number of devices and granularity of data, such monitoring may be applied in a distributed manner, e.g., on several servers deployed in distributed cloud service provider data centers in one or more locations. In one example, device-level information, including connections and usage history, network conditions, and other parameters may be obtained from call detail records (CDR) generated and stored by the telecommunication network. In particular, CDR may describe how the IoT devices connect and use resources in the telecommunication network. For example, CDRs may contain (but are not limited to): connection times and sessions, data volume, speed and throughput, diagnostic messages and errors, and so forth. Weather, authority reports, and other incident data may be correlated to increases in data and call volume, and possible disruptions. For instance, increased utilization by IoT devices may be more likely to be deemed non-faulty, or normal operations, when coincident with such events or incidents. Similarly, users' calendar data may be indicative of an expected large volume concentration or movement of people (and hence a concentration of IoT devices associated with such people or others (e.g., first responders deploying to an event at a large stadium as a precaution)). Likewise, in one example, IoT device location data may be correlated to map data (e.g., zoning data such school districts, commercial blocks, sport's venues, and others) which may be indicative of expected usage levels and/or types of data usage of one or more types of IoT devices.

Examples of the present disclosure are described herein illustratively in connection with IoT devices and systems utilized by first responders (e.g., firefighters, police, emergency medical service (EMS) personnel, etc.) and/or governmental or quasi-governmental entities (e.g., military, public health entities, etc.) that are entitled to access and utilize a priority network, or priority network slice(s). In addition, examples of the present disclosure relate to IoT devices that specifically comprise mobile monitoring devices that may be worn or carried by users, and/or which may be deployed to various vehicles of such users, and that are inaccessible to user control. For instance, a mobile monitoring device may be affixed to a vehicle that a user is assigned to operate. Thus, the mobile monitoring device may perform its primary function at various locations where the user navigates the vehicle, parks the vehicle, etc. However, the user may not be authorized to turn the mobile monitoring device on or off, may not be authorized to change the settings of the mobile monitoring device relating to data collection, data transmission, etc., and so forth. In this regard, it should be noted that a "primary function" of a mobile monitoring device may comprise the collection, storing, and/or reporting of a particular type of data, or multiple types of data from a physical environment, e.g., (images and/or video, weather and/or environmental data, biometric data, operational data of mechanical systems, such as for vehicular operational data (e.g., wheel rotations per minute (RPMs), rotor RPMs (e.g., such as for a helicopter, or the like), tire pressure, cabin pressure, or the like) that are recorded by independent IoT devices (e.g., that are not integral to a vehicular computing system). These and other aspects of the present disclosure are discussed in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a telecommunication network. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example network 102 may include a dedicated slice 107, e.g., a "network slice" that is reserved for first responders and/or governmental entities or quasi-governmental entities. For instance, dedicated slice 107 may comprise cellular core network components that service such entities, users associated with such entities, and/or their endpoint devices, while other users, entities, and/or their endpoint devices may be serviced by a different network slice, or slices. In one example, dedicated slice 107 may include an application server (AS) 104 and database (DB) 106, as discussed in further detail below. In one example, network 102 may also include a plurality of television (TV) servers (e.g., a broadcast server, a cable head-end), a plurality of content servers, an advertising server, an interactive TV/video-on-demand (VOD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 may include a wireless access point 117 (e.g., a cellular base station).

In one example, the access networks 120 may be in communication with various devices, or computing systems/ processing systems, such as mobile devices 115 and 155, augmented reality (AR) device 112 (e.g., AR eyewear), biometric device 113, body cam (or body camera) 150, camera 141, microphone 143, and Global Positioning System (GPS) tracker 144 (e.g., a GPS tracking unit) of ambulance 111, and so forth. Similarly, access networks 122 may be in communication with one or more devices, e.g., device 114, server(s) 116, database(s) (DB(s)) 118, etc. Access networks 120 and 122 may transmit and receive communications between mobile devices 115 and 155, AR device 112, biometric device 113, body cam 150, GPS tracker 144, camera 141, and/or microphone 143, and so forth, and server(s) 116 and/or DB(s) 118, application server (AS) 104 and/or database (DB) 106, other components of network 102, devices reachable via the Internet in general, and so forth.

In accordance with the present disclosure, a user, such as user 190, may be equipped with various devices, such as mobile device 115, AR device 112, and biometric device 113. For instance, mobile device 115 may comprise a cellular smart phone, a laptop, a tablet computer, or the like. AR device 112 may comprise a wearable computing device, e.g., smart glasses, or the like. Likewise biometric device 113 may comprise a wearable computing device, e.g., a smart watch, a fitness band, a heart rate monitor, a pedometer, etc. In accordance with the present disclosure, mobile device 115, AR device 112, and/or biometric device 113 may each include one or more sensors for tracking location, speed, distance, altitude, or the like (e.g., a Global Positioning System (GPS) unit), for tracking orientation (e.g., gyroscope and compass), and so forth. In addition, biometric device 113 may include sensors for measuring, recording, and reporting temperature, heart rate, breathing rate, blood oxygen, and so forth. It should be noted that user 190 may alternatively or additionally be equipped with other devices, such as a chest-mounted camera ("bodycam"), which in one example may further include at least one microphone, a push-to-talk (PTT) radio unit, and so forth.

Similarly, user 195 may be equipped with various devices, such as mobile device 155 and body cam 150. For instance, mobile device 155 may comprise a cellular smart phone, a laptop, a tablet computer, or the like. Body cam 155 may comprise a wearable computing device, e.g., affixed to a tactical vest, or the like. It should be noted that user 195 may alternatively or additionally be equipped with other devices, such as head or helmet-mounted camera, a biometric device, a push-to-talk (PTT) radio unit, and so forth. However, in one example, mobile devices 115 and 155 may include PTT functionality. For instance, mobile devices 115 and 155 may have dual operation modes for land mobile radio (LMR) as well as cellular communications (e.g., cellular PTT as well as general cellular voice calling, data connectivity, etc.). In this regard, mobile devices 115 and 155, AR device 112, biometric device 113, body cam 150, GPS tracker 144, camera 141, and/or microphone 143 may each include one or more radio frequency (RF) transceivers for cellular communications and/or for non-cellular wireless communications. In one example, body cam 150, biometric device 113, GPS tracker 144, camera 141, and microphone 143 may comprise network-connected "Internet of Things" (IoT) devices, and more particularly, mobile monitoring devices.

In one example, device 114 may comprise a mobile device, a cellular smart phone, a laptop, a tablet computer, a desktop computer, a wearable computing device (e.g., a smart watch, a smart pair of eyeglasses, etc.), an application server, a bank or cluster of such devices, or the like. For example, user 199 may comprise an authorized personnel of an entity that is utilizing network services via dedicated slice 107 (e.g., a first responder entity, a governmental entity, etc.). Thus, user 199 may perform various actions via device 114, such as configuring IoT devices (e.g., regarding an amount of data to record before transmitting, or alternatively enabling a live streaming mode, identifying destination systems to which data is to be transmitted, such as server(s) 116 and/or database(s) (DB(s) 118), selecting resolution and/or compression settings, e.g., for cameras, microphones, or the like, and so forth). In addition, user 199, via device 114, may register IoT devices with the network 102. In addition, user 199 may select data limits (e.g., daily, weekly, or monthly data limits), bandwidth limits, or the like. Alternatively, or in addition, user 199 may set warning thresholds for network utilization, e.g., in terms of data volume, data rate/bandwidth, number of connections, number of connection setup requests and/or rate of connection setup, and so on. In one example, device 114 may be in communication with server(s) 104, which may receive the IoT device registrations and/or the data limits and/or usage warning settings for such IoT devices.

Figure 4:
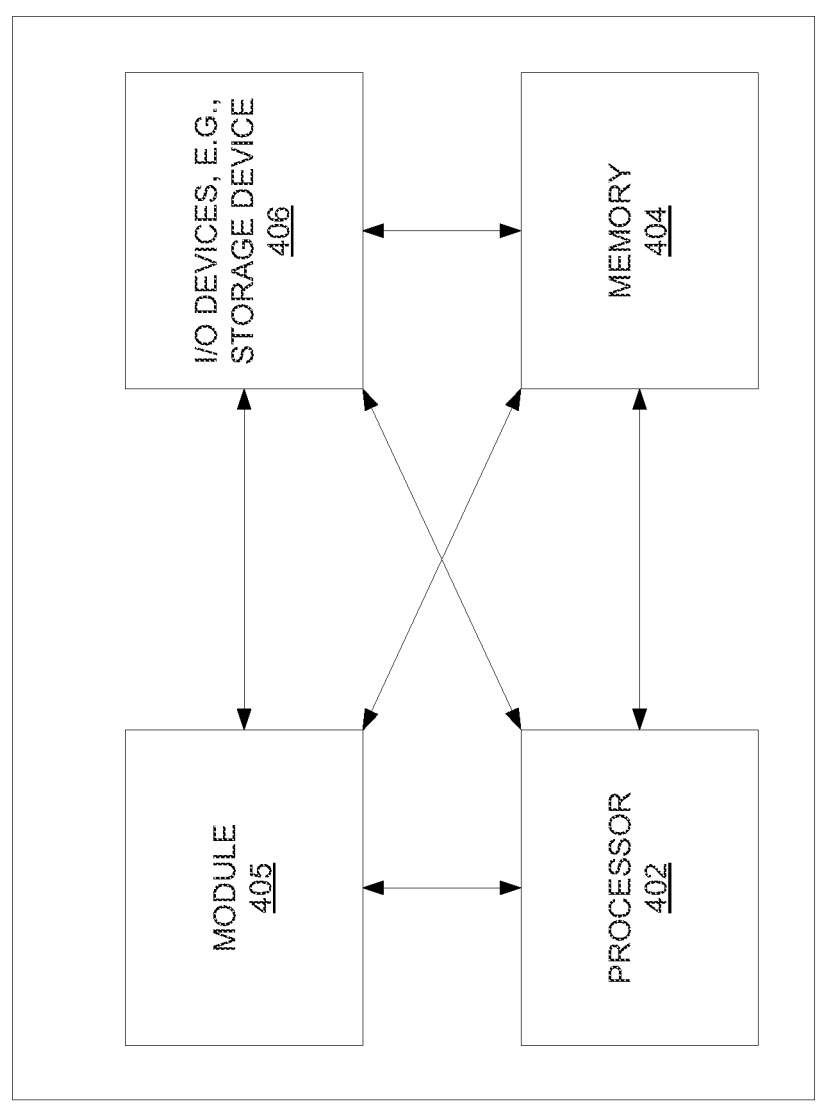
FIG. 4 illustrates a high level block diagram of a computing device specifically programmed to perform the steps, functions, blocks and/or operations described herein.

In accordance with the present disclosure, server(s) 104 may each comprise a computing system or server (e.g., an application server (AS)), or one or more computing systems or servers, such as computing system 400 depicted in FIG. 4, and may individually or collectively be configured to perform operations or functions for performing at least one remedial action in response to detecting an excess utilization of a telecommunication network by a plurality of mobile monitoring devices that is not caused by the primary function of the plurality of mobile monitoring devices (such as illustrated and described in connection with the example method 300 of FIG. 3).

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, database(s) (DB(s)) 106 may comprise one or more physical storage devices integrated with server (s) 104 (e.g., a database server), attached or coupled to the server(s) 104, or remotely accessible to server(s) 104 to store various types of information in support of systems for performing at least one remedial action in response to detecting an excess utilization of a telecommunication network by a plurality of mobile monitoring devices that is not caused by the primary function of the plurality of mobile monitoring devices, in accordance with the present disclosure. For example, DB(s) 106 may store records for a plurality of IoT devices, e.g., all or a portion of IoT devices that are provided network services via access network(s) 120 and network 102, such as IoT devices that are opted-in to excess usage tracking, prediction, and alerting. For instance, for each IoT device, a record may include a device identifier (e.g., an International Mobile Subscriber Identity (IMSI) number, an International Mobile Equipment Identity (IMEI), or the like), a device type (e.g., make, model, hardware version, software version, etc.), and a device owner and/or operator identity (e.g., the entity that is responsible for and controls the IoT device). Each record may also include historical and current utilization metrics for an IoT device, such as: an average daily data usage, an average hourly data usage, an average hourly data usage by hour of the day, day of the week, etc., an hourly data usage over the last 24 hours, 48 hours, and so on. It should be noted that any or all of the foregoing may further be segregated by respective uplink and downlink utilization metrics). Each record may alternatively or additionally include: an average number of simultaneous sessions (e.g., hourly, daily, etc.), a number of simultaneous sessions recorded for each hour for the past 24 hours, 48 hours, etc., a peak number of simultaneous sessions in each hour time period over the last 24 hours, 48 hours, etc., an average peak number of simultaneous sessions hourly over the last 30 days, 60 days, etc., an average peak number of simultaneous sessions over the last 30 days, 60 days, etc. for each hour of the day, for each hour of the day on weekdays, for each hour of the day on weekends, etc., average connection/session setup rates over one or more time periods, connection/session setup rates for the last 24 hours, 48 hours, etc. (e.g., broken down by hour), an average number of simultaneous default bearers, and so forth. In one example, the records may be segregated by IoT device type, by the owner/operator/responsible entity, or the like (e.g., in adjacent rows of a table, in separate tables, etc.). Each record may alternatively or additionally include one or more data limits, bandwidth limits, or the like for an IoT device, and/or warning thresholds for network utilization for the IoT device. For instance, these limits and/or warning thresholds may be received from device 114 as noted above.

DB(s) 106 may also comprise one or more geographic databases, e.g., storing maps and/or geographic data sets. For instance, DB(s) 106 may store a map/geographic data set for an area that may include landmarks that may be relevant to increased utilization of access network(s) 120 and/or network 102 by one or more types of IoT devices for one or more entities. In one example, DB(s) 106 may also store weather data for an area, incident report data for an area, scheduled event data for an area, and/or calendar data for various users in the area (e.g., with opt-in participation by such users). In one example, DB(s) 106 may also store a database of prediction models, e.g., machine learning models (MLMs) or the like, for predicting network utilization for one or more types of IoT device (e.g., for one or more future time periods).

It should be noted that as referred to herein, a machine learning model (MLM) (or machine learning-based model) may comprise a machine learning algorithm (MLA) that has been "trained" or configured in accordance with input training data to perform a particular service, e.g., to predict an excess utilization (e.g., utilization of one or more aspects of network 102 and/or access network 120 that exceeds a threshold). For instance, in accordance with the present disclosure, an MLA (or a trained MLM) may comprise a deep learning neural network, or deep neural network (DNN), such as convolutional neural network (CNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs, or other detection models may be implemented in examples of the present disclosure such as a gradient boosted decision tree (GBDT), k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like.

In one example, server(s) 116 may obtain and store data from IoT devices in DB(s) 118. For instance, video feeds from camera 141, AR device 112, and/or body cam 150, an audio feed from microphone 143, or the like may be transmitted by such devices to server(s) 116, which may store the received data in DB(s) 118. Similarly, GPS location data may be transmitted by GPS tracker 144 to server(s) 116, which may store the received data in DB(s) 118. In addition, biometric data (e.g., heart rate, breathing rate, sleep/wake data, etc.) from biometric device 113 may also be received by server(s) 116 and stored in DB(s) 118. The data may then be reviewed and used by authorized users for a variety of purposes. For instance, user 199 via device 114 or another authorized user may communicate with server(s) 116 to select video or images to view, listen to recorded audio, or the like, may view GPS location data in table form and/or plotted on a map, may view biometric data of one or more users (e.g., user 190, etc.) in table form and/or in one or more charts, graphs, or other forms of data visualization, and so forth. For instance, server(s) 116 may process user queries, retrieve the relevant data from DB(s) 118, and transmit the data to requesting devices.

As noted above, examples of the present disclosure address excessive network utilization by mobile monitoring devices. In an illustrative example, a plurality of GPS trackers (e.g., including GPS tracker 144) may be enrolled for excessive network utilization monitoring, reporting, and remediation via server(s) 104. For instance, the GPS trackers may be enrolled by user 199 via device 114. Alternatively, or in addition, a network operator of network 102 and access network(s) 120 may enroll the GPS trackers, e.g., for its own network management purposes. In one example, the network utilization by the GPS trackers may be quantified via call detail records (CDRs) that may be collected by server(s) 104 and stored in DB(s) 106. For instance, the CDRs may be generated by elements of network 102 (e.g., network elements of dedicated slice 107) and may record information such as connection times and sessions, data volume, speed and throughput, diagnostic messages and errors, and so forth. In one example, server(s) 104 may process the CDRs to determine various utilization metrics noted above (e.g., various data usage metrics, bandwidth usage metrics, session metrics, such as a number of sessions, number and rate of session setup requests, etc.), and which may be stored in records for the respective GPS trackers in DB(s) 106. In one example, server(s) 104 may similarly obtain records from elements of access network(s) 120, e.g., per-device RAN utilization records, aggregate records, such as a utilization table that records per-device utilization of access network(s) 120 over a period of time, per-session records (e.g., where the overall utilization of access network(s) 120 by a given device having multiple communication sessions over a period of time may be determined from multiple session records), and so forth.

In one example, server(s) 104 may determine dynamic utilization thresholds and/or baselines based upon the IoT device records stored in DB(s) 106 (and/or from the collected CDRs upon which information in the IoT device records is based). For instance, server(s) 104 may identify baseline aggregate metrics such as: an average daily data volume, an average peak bandwidth utilization, and so forth across all of the GPS trackers enrolled for monitoring. In addition, server(s) 104 may then calculate one or more excess utilization thresholds based upon such aggregate baseline metrics. For example, a threshold for excessive daily data utilization may be set at four times the average daily data volume for the GPS trackers, one standard deviation from the average daily data volume, etc.

Continuing with the present example, server(s) 104 may then engage in ongoing monitoring of the GPS trackers. For instance, for each day or for each rolling 24 hour time period, server(s) 104 may scan the records for each GPS tracker and identify any GPS tracker that has data usage that exceeds the threshold for excessive daily data utilization, and similarly for other daily utilization thresholds, such as excessive peak bandwidth utilization, excessive number of daily connection setup requests, and so forth. It should again be noted that the threshold(s) may be calculated as described above, or may be set in accordance with an input by an authorized user (e.g., user 199) and/or by a network operator.

In one example, server(s) 104 may transmit a report of the excess utilization by one or more of the GPS trackers, e.g., to user 199 at device 114. In one example, the same or similar report may be transmitted to personnel of the network operator, to a device manufacturer, or others. The report may identify the affected device(s), the amount of excess utilization for each device or overall, and other information, such as remaining allotted data volume with a billing period, any excess charges incurred to date, and so on. In one example, server(s) 104 may also enable notified users to access additional information from DB(s) 106, such as obtaining data for average daily usage for one or all of the GPS trackers for visualization in a chart or the like, for GPS trackers in a selected area, and so forth.

In one example, server(s) 104 may enable authorized users to request remedial actions to be applied via the telecommunication network (e.g., within access network(s) 120 and/or network slice 107, for example). For instance, user 199 via device 114 may request blocking or rate-limiting transmit data or receive data of all or some of the GPS trackers, may request selective blocking of connection requests from all or some of the GPS trackers, and so forth. In one example, server(s) 104 may automatically implement one or more remedial actions (e.g., blocking, rate-limiting, etc.). For instance, server(s) 104 may be preconfigured to take such actions in response to individual GPS trackers exceeding one or more utilization thresholds, in response to a threshold number of GPS trackers exceeding one or more utilization thresholds, and so forth. In one example, server(s) 104 may communicate with components of network slice 107 and/or access network(s) 120 to impose device-specific or group policies for blocking, rate-limiting, etc. For instance, server(s) 104 may instruct a policy and charging rules function (PCRF) to change one or more policies for the one or more GPS trackers. In turn, other components may be caused to treat the one or more GPS trackers differently based upon new policies and/or rules relating to bearer setup, assigned packet data network (PDN) gateway, and so forth. In one example, server(s) 104 may communicate with a self-optimizing network (SON) coordinator or the like, to request any necessary changes. For instance, affected GPS trackers may be offloaded to a different baseband unit associated with wireless access point 117, to a different serving gateway (SGW), etc., may be assigned a quality class indicator (QCI) or quality of service (QoS) with a lower priority, and so on.

It should be noted that the GPS trackers may be deployed by a first responder organization, such as tracking all police vehicles for a large city. In this regard, dedicated slice 107 and access network(s) 120 may be intended to provide a high availability and priority of communication to such organization. However, at the same time, other first responder organizations and governmental entities may also have the same guarantees that may be affected when IoT devices of one entity consume or attempt to consume a disproportionate amount of network resources. Thus, blocking, rate limiting, or other remedial actions may be imposed selectively, e.g., to guarantee that other entities' service level agreements (SLAs) are met, when it is clear that a certain class or segment of IoT devices are malfunctioning or otherwise have network traffic that is not associated with the primary function of such devices.

In one example, server(s) 104 may also track IoT devices for predicted excess utilization (e.g., exceeding one or more thresholds for implementing one or more remedial actions). In particular, as noted above, server(s) 104 may collect various operational data from IoT devices and store such data in DB(s) 106 for various purposes, such as calculating baseline/average utilizations, for providing data and/or reports in response to user queries, and so forth. In addition, in one example, server(s) 104 may perform an ongoing evaluation of various IoT devices, and more specifically mobile monitoring devices, for predicted excess utilization. For instance, IoT device data stored in DB(s) 106 and/or current/real-time data collected from IoT devices may comprise input data to one or more prediction models for predicting excess utilization.

In one example, a prediction (or forecast) of excess utilization by a mobile monitoring device may be made using a time series prediction/forecasting model, e.g., based upon past and current utilization factors as predictors, such as a moving average (MA) model, an autoregressive distributed lag (ADL) model, an autoregressive integrated moving average (ARIMA) model, a seasonal ARIMA (SARIMA) model, or the like. Similarly, other regression-based models may be trained and used for prediction, such as logistic regression, polynomial regression, ridge regression, lasso regression, etc. In one example, the present disclosure may predict/forecast future excess utilization using multiple factors as predictors (e.g., covariates, or exogenous factors). For instance, a seasonal auto-regressive integrated moving average with exogenous factors (SARIMAX) model may be used. Alternatively, a vector auto-regression (VAR), or VAR moving average (VARMA) model may be used. For instance, predictions/forecasts for multiple mobile monitoring devices may be made in a multivariate analysis. Similarly, a vector auto-regression moving-average with exogenous factors/regressors (VARMAX) model may be applied. In one example, an output between 0 and 1 may indicate a probability (e.g., a likelihood) of a mobile monitoring device having excess utilization (or not) at a future time period. For instance, an output of 0.5 may indicate a 50% probability/likelihood of excess utilization (or not) at the future time period. In another example, an output may be a predicted utilization (where a predicted excess utilization or lack thereof may be predicted by determining whether the predicted utilization exceeds a threshold (or not)). In one example, the prediction model(s) may use past network utilization metrics (e.g., data volume, bandwidth, connection requests, etc.) as input factors/predictions (e.g., an input vector), and may alternatively or additionally include moving averages (MAs) of such metrics (e.g., a 12-hour MA, a daily MA, a 2-day MA, a weekly MA, etc.), weighted moving averages, and so forth.

In one example, an MLM for predicting future network utilization (e.g., for predicting future excess network utilization) may comprise a recurrent neural network (RNN), a long-short term memory (LSTM) neural network, or the like. For instance, RNNs and LSTMs may be trained on and make predictions with respect to time series data. In another example, an MLM for predicting/forecasting excess network utilization may comprise a convolutional neural network (CNN) that is suitable for time series data, such as an AlexNet or WaveNet. In accordance with the present disclosure, inputs/predictors for any or all of such predictions or forecasting models may include past and current network utilization metrics. In one example, inputs/predictors may further include covariates. For instance, the time series data may relate to a same type of data for which a future utilization is being predicted (e.g., predicting future data volume based upon past and current data volumes). However, the prediction of future data volumes may further be based upon past and current bandwidth utilization metrics, past and current connection setup requests, and so on. Other covariates may include known events that may be input by an operator or that may be identified by an event feed (e.g., a Really Simple Syndication (RSS) feed, or the like), such as a large convention, a major sporting event or concert, known local school vacation weeks, past or current weather, or weather predictions for one or more future time periods (e.g., from a weather data feed), user factors (e.g., past or current user and/or vehicle locations, predicted locations (e.g., based on schedule/calendar data), landmarks associated with such locations, etc.), and so forth. In one example, the prediction model(s) may be trained at one or more network-based processing systems (e.g., server(s) 104). Similarly, the prediction model(s) may be deployed and operate on one or more network-based processing systems (e.g., server(s) 104).

In one example, one or more remedial actions may be applied via the telecommunication network (e.g., within access network(s) 120 and/or network slice 107, for example) in response to predicted excess utilizations. In one example, the remedial action(s) may be triggered when a threshold number of mobile monitoring devices of a same type are predicted to have excess network utilization. For instance, server(s) 104 may be preconfigured to take such actions in response to individual GPS trackers being predicted to exceed one or more utilization thresholds, in response to a threshold number of GPS trackers being predicted to exceed one or more utilization thresholds, in response to a threshold number of GPS trackers associated with a single entity being predicted to exceed one or more utilization thresholds, and so forth. As noted above, server(s) 104 may communicate with components of network slice 107 and/or access network(s) 120 to impose device-specific or group policies for blocking, rate-limiting, QoS and/or QCI tagging, and so forth.

It should be noted that the foregoing are just several examples of performing at least one remedial action in response to detecting an excess utilization of a telecommunication network by a plurality of mobile monitoring devices that is not caused by the primary function of the plurality of mobile monitoring devices, and that other, further, and different examples may be established in connection with the example of FIG. 1. It should also be noted that any number of server(s) 104 or database(s) 106 may be deployed. In one example, server(s) 116 may perform the same or similar functions as server(s) 104. Similarly, DB(s) 118 may store the same or similar information as DB(s) 106. In one example, network 102 may provide an excess network utilization notification service to subscribing users and/or devices, e.g., in addition to television, phone, and/or other telecommunication services. In one example, the excess network utilization notification service may reside within dedicated slice 107 and may be provided to types/categories of users having endpoint devices that are provided network services via dedicated slice 107 (e.g., first responders, governmental entities, etc.). In one example, AS 104, DB 106, server(s) 116, and/or DB(s) 118, or any one or more of such devices in conjunction with, mobile devices 115 and 155, AR device 112, one or more IoT devices, and so forth, may operate in a distributed and/or coordinated manner to perform various steps, functions, and/or operations described herein.

In addition, it should be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. Similarly, although only two access networks 120 and 122 are shown, in other examples, access networks 120 and/or 122 may each comprise a plurality of different access networks that may interface with network 102 independently or in a chained manner. For example, device 114 and server(s) 116 may be in communication with network 102 via different access networks, mobile device 115, mobile device 155, body cam 150, AR device 112, biometric device 113, camera 141, and microphone 143, may be in communication with network 102 via two or more different access networks, and so forth.

Thus, these and other modifications are all contemplated within the scope of the present disclosure.

To further aid in understanding the present disclosure, FIG. 2 illustrates examples of current/real-time excess network utilization detection and reporting (210) and predicted excess network utilization detection and reporting (220). In the first example 210, a monitoring component 212 may oversee mobile monitoring devices, checking possible offenders according to one or more defined metrics, such as thresholds given by a system operator. The monitoring may be ongoing, such as periodically, or can be executed on-demand, such as in response to a user/operator request. For instance, a human operator may interact via a user interface (UI), such as a webpage or application via a computing device of the operator. However, it should be noted that in another example, the monitoring component 212 may be configured to receive requests from another system or device, e.g., connected via one or more networks via an application programming interface (API).

In the first illustrative example 210, a user/external agent 211 may request in stage 1 (indicated by arrow 1) a list of a previous monitoring requests submitted by the user/external agent 211 or by others. In response, the monitoring component 212 may provide a list of previous requests submitted either by user/external agent 211 or other authorized users/agents. In such case, the user/external agent 211 may select to either rerun a previous monitoring request, in cases of one-time requests, to be added as a listener to one or more recurrent monitoring requests, or to rerun a recurrent request a single time. Alternatively, or in addition, the user/external agent 211 may submit a new monitoring request. For example, user/external agent 211 may request a one-time, on-demand report relating to a defined set of mobile monitoring devices over a defined period of time. In one example, user/external agent 211 may submit a recurrent monitoring request. In this case, the user/external agent 211 can set up the periodicity in which the monitoring will occur, such as hourly, daily, weekly, or another time granularity. In both cases, the monitoring component 212 may confirm that the user/external agent 211 has proper permissions to access the list(s) and execute the request(s).

The contents of a request may comprise several components, depending on the type of request. For instance, for a one-time/on-demand or recurrent request, the request may define a time window (e.g., the start and end dates for reporting), specific dates (e.g., July 1st to July 31st, etc.), time ranges (e.g., the last week, the last two weeks, the first hour of the day, the first 15 business days of the month, etc.), and so forth. It should be noted that the time granularity can also vary as defined by the user/external agent 211. A request may also define mobile monitoring devices to be tracked (e.g., a single or specific set of devices) or one or more defining features for group devices (e.g., devices belonging to a market, vendor, customer, or device type, etc.). It should also be noted that in one example, multiple filtering criteria can be used together.

A request may further include utilization metrics, or performance indicators (e.g., key performance indicators (KPIs)), to be monitored. For instance, these metrics may represent the behavior and/or performance of the mobile monitoring devices and the network, and may include: average/total download/upload volume, average/total number of connections or attempts of connection, and so forth. For the utilization metrics, the user/external agent 211 may also include in the request one or more thresholds (which may include both upper and lower bounds) for the utilization metrics to be monitored. For instance, example thresholds may be defined as: "total volume>100 MB (entire period)," "total volume>10 MB per day," "number of connections<10 or >100 per hour," etc. Alternatively, or in addition, user/external agent 211 may specify one or more automatic thresholds in the request, such as: "total daily volume>average daily volume" (+−standard deviation) for the "entire period" or "weekly basis," "new-high number of connections," "daily" or "weekly," or the like. It should again be noted that the user/external agent 211 can mix and match different utilization metrics and time granularities.

Once a request is received, at stage 2 the monitoring component 212 may trigger the report generation for on-demand requests, or schedule the generation of recurrent requests. In one example, different monitoring requests may contain elements in common. Therefore, the monitoring component 212 may combine such requests for a single data fetching, avoiding duplicate work. In particular, in stage 2, the monitoring component 212 may fetch data from several sources (e.g., data sources 213). At stage 3, the data may be filtered and normalized either by the data provider (e.g., data sources 213) or by the monitoring component 212. The monitoring component 212 may then build the one or more reports. For each report, the monitoring component 212 may analyze the utilization metrics, and may record any flags triggered according to the established rules in the requests (e.g., noting any thresholds that are reached and/or exceeded). Again, different reports may relate to the same utilization metrics for a same set of devices. Thus, the monitoring component 212 may detect such overlaps and optimize the analysis by not repeating a previously performed analysis. Once the monitoring component 212 finishes the report(s), the report(s) may be provided to the user/external agent 211 at stage 4. In addition, at stage 5, the monitoring component 212 may also store the report(s) in a database (e.g., request/report storage 214) for future use. The reports can be provided in several ways, such as being presented via a UI, email, text message, or the like, via an API for other computing system clients (either synchronous or asynchronous), and so forth.

As noted above, FIG. 2 also illustrates a second example (220) for predicted excess network utilization detection and reporting. In the second example (220), a predictor/recommender component 222 may be configured to predict possible or future offenders and suggest mitigation actions, or "remedial actions." Predictor/recommender component 222 may operate in several modes, directed either from user input or automatic inference from the request/report storage 224. For instance, in one example, the request/report storage 224 may be the same as or similar to request/report storage 214 of the first example (210). In this regard, it should be noted that in one example, the monitoring component 212 and the predictor/recommender component 222 may comprise two modules of a same processing system (e.g., a server or the like that performs both (1) real-time monitoring and detection of excess network utilization by mobile monitoring devices, and (2) forecasting/prediction of possible excess network utilization). Continuing with the second example (220), the predictions and recommendations can be made at several granularity levels: on a per-device basis, where each mobile monitoring device is tracked and individual prediction models may be built, and/or on a group-basis, where a set/group of mobile monitoring devices are used to create a model for the set/group. For instance, per-device modeling may be used to track a limited number of mobile monitoring devices. For example, in a law-enforcement fleet, there may be numerous surface-operating, multiple-purpose vehicles with mobile monitoring devices, but few aerial vehicles. Thus, special-purpose mobile monitoring devices, and/or mobile monitoring devices deployed to unique vehicles may be candidates for per-device modeling. On the other hand, modeling on a group basis may capture more general behavior over group feature(s) such as region/market, vendor, customer, or device types, among others. Such a strategy may be advantageous for a large number of similar mobile monitoring devices that are intended to be used in a similar way. The predictor/recommender component 222 may run autonomously or with little oversight. For instance, users may access the predictor/recommender component 222 on a subscription basis. To illustrate, in stage 1, a user or external agent 221 may subscribe to alerts and/or recommendations for a specific group of devices. As in the previous example, the user/external agent 221 can subscribe to a set, wherein individual devices are defined as belonging to the set, or wherein the set may be defined based on a grouping/filtering criteria, such as device type, market, vendor, customer, or any other combinations of device features, and/or or device operator features.

Since multiple user subscriptions may intersect, the predictor/recommender component 222 may combine such requests. In one example, the predictor/recommender component 222 may operate in two phases: a model building phase and a monitoring/recommendation phase. In the model building phase, the predictor/recommender component 222 may fetch and normalize data from one or more data sources 223 (stage 2), and/or from the internal reports and monitoring requests from request/report storage 224 (stage 3), For instance, the reports may be for previously submitted requests to both monitoring component 212 and predictor/recommender component 222. This information, together with a list of mobile monitoring devices, may be sent to the modeling subcomponent 225 (stage 4). The modeling subcomponent 225 may build one or several prediction models (e.g., MLMs comprising trained MLAs, such as described above). Again, the modeling may be for individual mobile monitoring devices, or one or more groups of mobile monitoring devices. In one example, the prediction models may be retrained periodically and/or may be retrained in response to performance degradation, or other factors. In addition, the retraining schedule or retraining criteria may be device-specific and/or may vary for different groups of mobile monitoring devices.

In the recommendation phase, the predictor/recommender component 222 may again fetch recent data from the data sources 223 and request/report storage 224. The predictor/recommender component 222 may then apply such data as input(s) to the trained prediction model(s). In addition, the predictor/recommender component 222 may compare the predicted values/states with one or more thresholds for one or more utilization metrics for each mobile monitoring device or group/set of mobile monitoring devices. If the predictor/recommender component 222 finds any predicted values/states that exceed the associated thresholds, the predictor/recommender component 222 may send a notification to the subscribed user/external agent 221, based on the subscription(s) (stage 5). In one example, the predictor/recommender component 222 may also send one or more device profiles to the subscribed user/external agent 221, which may contain a history, or histories of the monitored network utilization metric(s), and possible explanations for the deviation(s) (e.g., based on the prediction model(s) used).

FIG. 3 illustrates a flowchart of an example method 300 for performing at least one remedial action in response to detecting an excess utilization of a telecommunication network by a plurality of mobile monitoring devices that is not caused by the primary function of the plurality of mobile monitoring devices. In one example, the method 300 is performed by a network-based component of the system 100 of FIG. 1, such as by server(s) 104, server(s) 116, and/or any one or more components thereof (e.g., a processor, or processors, performing operations stored in and loaded from a memory), by server(s) 104 and/or server(s) 116 in conjunction with one or more other devices, such as DB(s) 106, DB(s) 118, mobile devices 115 and 155, AR device 112, biometric device 113, camera 141, microphone 143, body cam 150, and so forth. In one example, the steps, functions, or operations of method 300 may be performed by a computing device or system 400, and/or processor 402 as described in connection with FIG. 4 below. For instance, the computing device or system 400 may represent any one or more components of a device, server, and/or application server in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310, optional step 320, or step 330.

At optional step 310, the processing system may obtain utilization metrics associated with a utilization of a telecommunication network by a plurality of mobile monitoring devices. In particular, the plurality of mobile monitoring devices may be of a same mobile monitoring device type. In addition, in accordance with the present disclosure, a primary function of the plurality of mobile monitoring devices may be inaccessible to control by a plurality of users associated with the mobile monitoring devices. In other words, the users may carry the mobile monitoring devices on their persons, or may operate or ride in vehicles in or on which the mobile monitoring devices are deployed. However, the users may be prevented from turning such mobile monitoring devices on or off, changing settings for data collection and/or data reporting, and so on, either by the inherent physical configurations of such devices (e.g., the devices may lack an external or accessible on/off switch), and/or by hardware and/or software configurations that deny such access. The primary function of the plurality of mobile monitoring devices may comprise the collection and reporting and/or storage of data pertaining to a physical environment, e.g., weather data, physical operational data of a vehicle or other machine, biometric data, and so forth.

In one example, the plurality of users may be associated with an operator of the plurality of mobile monitoring devices. For instance, the operator may comprise a governmental entity, a public safety entity, or the like. Thus, the users may comprise police officers, firefighters, paramedics, emergency medical technicians, hazardous material team members, roadwork or other public works personnel, and so forth. In one example, communications of the plurality of mobile monitoring devices may processed via a dedicated core network of the telecommunication network (or "network slice") that is reserved for use by governmental and public safety entities. In addition, in one example, communications of the plurality of mobile monitoring devices may be processed via access network resources of the telecommunication network that are reserved or prioritized for use by governmental and public safety entities. For instance, an access network may be configured such that QCIs 1-3 are only available for such governmental and/or public safety entities.

In one example, optional step 310 may include collecting call detail records (CDRs) associated with the plurality of mobile monitoring devices. For instance, each CDR may include an identifier of a mobile monitoring device, and identifier or identifiers of one or more recipients or intended recipients, connection time, a session duration, a data volume, a throughput measure, an error flag, and so forth. In one example, the processing system includes multiple CDRs per mobile monitoring device, e.g., one per connection/session, where the mobile monitoring device uses intermittent connectivity, or can have one or more CDR(s) per mobile monitoring device, e.g., where the CDR is closed-out periodically. For instance, some mobile monitoring devices may use persistent or semi-persistent sessions where there may be long periods of time between data transmissions. In one example, optional step 310 may include calculating or deriving the utilization metrics from the CDRs. In another example, a separate system may derive utilization metrics from the CDRs, from operational data of one or more components of the telecommunication network, and so forth. In such case, the processing system may obtain the utilization metrics from the other systems and/or from a storage repository (e.g., a database system storing the utilization metrics).

At optional step 320, the processing system may obtain a request to track a network utilization of the plurality of mobile monitoring devices. For instance, the request may be from the owner or operator of the plurality of mobile monitoring devices, or may be from personnel or an automated system of the telecommunication network operator. In one example, the request may identify the plurality of mobile monitoring devices. For instance, the request may identify the plurality of mobile monitoring devices in accordance with at least one identification factor, such as a device type of the plurality of mobile monitoring devices (e.g., GPS tracker, bodycam, dashcam, microphone, etc.). In one example, the plurality of mobile monitoring devices may be further defined by manufacturer, model type, firmware version, or other identifier(s) that can be used to define a group of mobile monitoring devices. Alternatively, or in addition, the plurality of mobile monitoring devices may be further defined by an owner of the plurality of mobile monitoring devices, an entity that is authorized to receive data from the plurality of mobile monitoring devices (and which may also be authorized to transmit data to or otherwise communicate with the plurality of mobile monitoring devices), or the like. In one example, the request may further include a time constraint associated with the plurality of mobile monitoring devices (e.g., monitor for the month of June only, monitor only for overnight usage, daytime usage, weekday usage, etc.) and/or a geographic constraint associated with the plurality of mobile monitoring devices (e.g., mobile monitoring devices within area X, mobile monitoring devices comprising GPS trackers of City Y within area X, etc.). In addition, in one example, the request may further include at least one threshold for at least one type of excess utilization of the telecommunication network to be tracked. For instance, the threshold(s) may be the same or similar to the examples discussed above (e.g., "total volume>10 MB per day", "number connections<10 or >100 per hour", etc.). In one example, the request may be for current/real-time excess utilization detection and warning, e.g., on an ongoing basis, until a defined expiration date/time, for a specified time window (e.g., if not starting immediately), and so forth. In another example, the request may be for forecasting/predicting excess utilization for future time periods (e.g., for a one time projection for a defined future time period, or on an ongoing basis (e.g., rolling forecasts for 48 hours out, one week out, two weeks out, etc.). In still another example, the request may specify both current/real-time and forecast detection and warning of excess network utilization for the plurality of mobile monitoring devices.

At optional step 330, the processing system may apply an input data set comprising the utilization metrics to at least one machine learning model (MLM) implemented by the processing system. In one example, the MLM may comprise a time series prediction model (or forecasting model). In one example, the input data set may further include one or more covariates. For instance, additional input data may include as weather data of an area containing the plurality of mobile monitoring devices, event data for scheduled events in the area, and/or geographic landmark data in the area. In one example, additional input data may include calendar data of a plurality of users associated with the area, (e.g., users present in the area or anticipated to be present in the area; the users can be users associated with the plurality of mobile monitoring devices or vehicles in or on which the mobile monitoring devices may be deployed, users comprising the general public, subscribers, and/or other users of the telecommunication network, or any or all of the above in combination). Similarly, in one example, additional input data may include incident report data for the area. For instance, an incident report may be obtained from an incident report feed (such as an RSS feed) for emergency services (e.g., police, fire, EMT, hazmat, etc., transportation authority (e.g., traffic data feed), etc.).

At step 340, the processing system identifies an excess utilization of the telecommunication network by the plurality of mobile monitoring devices (or a subset of the plurality of mobile monitoring devices). It is again noted that the plurality of mobile monitoring devices may be of a same mobile monitoring device type. In addition, a primary function of the plurality of mobile monitoring devices may be inaccessible to control by a plurality of users associated with the mobile monitoring devices. In one example, the excess utilization may be a predicted excess utilization, e.g., in an example in which a request relates to predicted/forecast excess network utilization and/or in which optional step 330 is performed. For instance, in such case, the excess utilization may be detected in accordance with at least one output of the at least one machine learning model. In one example, the detecting of the excess utilization of the telecommunication network by the plurality of mobile monitoring devices may be performed in response to a request that may be received at optional step 320. The excess utilization may comprise at least one of: an average per-device bandwidth utilization of the plurality of mobile monitoring devices exceeding a first threshold (e.g., a radio access network (RAN) air interface bandwidth, a cellular backhaul bandwidth, or bandwidth measured at any other relevant point(s) of the telecommunication network), an average per-device data usage (data volume) of the plurality of mobile monitoring devices exceeding a second threshold (e.g., data usage per unit time, e.g., MB per month, etc., which may relate to incoming data, outgoing data, or both), an average number of simultaneous active sessions per-device of the plurality of mobile monitoring devices exceeding a third threshold, an average per-device number of connection (e.g., session)

setup requests of the plurality of mobile monitoring devices exceeding a fourth threshold (e.g., excessive number of session setup attempts), an average per-device rate of connection setup requests of the plurality of mobile monitoring devices exceeding a fifth threshold, and so forth. It should be noted that one or more thresholds may relate to interim time periods, e.g., a rate of bandwidth and/or data usage on track to exceed monthly allotment by exceeding a rate threshold, or an interim threshold (e.g., more than X amount of data in 2 weeks, may indicate that the mobile monitoring devices are on track to exceed a monthly allotment).

In one example, any one or more of the abovementioned thresholds, or other(s) may comprise a dynamic threshold based upon an aggregate utilization metric for a set of mobile monitoring device that includes the plurality of monitoring device and a plurality of additional monitoring devices (e.g., all GPS tracker units vs. GPS tracker units of manufacturer X, GPS tracker units deployed by City Y for fleet management vs. GPS tracker units of manufacturer X deployed by City Y for fleet management, all GPS tracker units for all entities in an area (or overall for all entities serviced by the telecommunication network) vs. GPS tracker units of entity Y, etc.).

At step 350, the processing system determines that the excess utilization is not caused by the primary function of the plurality of mobile monitoring devices. For instance, step 350 may comprise determining that there is not a geographic concentration of the plurality of mobile monitoring devices, determining that there is not a scheduled event or a reported incident that is correlated to an increased utilization of the telecommunication network in accordance with the primary function of the plurality of mobile monitoring devices, and so forth. In one example, the processing system may utilize the covariates, e.g., weather data, calendar data, incident report data, event data, geographic landmark data, or the like, to determine that the excess utilization is not caused by the primary function of the plurality of mobile monitoring devices. For instance, excess utilization may be expected when there is a major incident that may cause for a large concentration of mobile monitoring devices and large amounts of data collection and reporting. For example, a police department may enable centralized control of body cams. In addition the body cams may be configured to automatically begin recording when an associated user is assigned to an active call. Thus, if there is a large number of calls associated with a major incident, then it may cause multiple users to be "active" on a call or calls, where the utilization of the network may be expected to increase related to the primary function of the mobile monitoring devices, e.g., recording video. As such, the detection of excess utilization may not trigger any warnings or other remedial actions since such excess utilization is well expected.

At step 360, the processing system performs at least one remedial action in response to the detecting of the excess utilization that is not caused by the primary function of the plurality of mobile monitoring devices. For instance, the at least one remedial action may include blocking at least one of: transmit data or receive data of at least a portion of the plurality of mobile monitoring devices. In one example, the at least one remedial action may alternatively or additionally comprise rate-limiting at least one of the transmit data or the receive data of the at least a portion of the plurality of mobile monitoring devices, imposing selective blocking of connection requests from the at least a portion of the plurality of mobile monitoring devices, reconfiguring at least one aspect of the communication network, such as rerouting traffic, adding new VNF(s), load balancing between database servers, and so forth.

In one example, the at least one remedial action may alternatively or additionally comprise transmitting a report of the excess utilization of the telecommunication network to at least one of an operator of the plurality of mobile monitoring devices (e.g., one or more authorized users of a governmental or public safety entity) or a manufacturer of the plurality of mobile monitoring devices. The report may include various information as noted above, such as a list of the plurality of mobile monitoring devices, the type of mobile monitoring devices, users associated with the plurality of mobile monitoring devices (if applicable), vehicles associated with the plurality of mobile monitoring devices (if applicable), histories or links to access histories of one or more of the plurality of mobile monitoring devices, the time periods associated with detected excess utilization and/or forecast excess utilization, the threshold(s) exceeded, and so forth.

At optional step 370, the processing system may receive a request from at least one of the operator or the manufacturer to impose at least one additional remedial action via the telecommunication network. For instance, the request may be made in response to a report provided at step 360.

At optional step 380, the processing system may implement the at least one additional remedial action in response to the request. For instance, the at least one additional remedial action may be the same or similar to the remedial actions noted above in connection with step 360.

Following step 360 or optional step 380, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example, the processing system may repeat steps 320-340 until an excess utilization is detected, may repeat steps 310-360, steps 310-380, steps 340-360, and so forth for additional requests, for ongoing monitoring relating to a persistent request, and so on. In one example, the method 300 may include obtaining training data, training one or more prediction models, and so forth. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the examples of FIG. 2 or 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for performing at least one remedial action in response to detecting an excess utilization of a telecommunication network by a plurality of mobile monitoring devices that is not caused by the primary function of the plurality of mobile monitoring devices, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for performing at least one remedial action in response to detecting an excess utilization of a telecommunication network by a plurality of mobile monitoring devices that is not caused by the primary function of the plurality of mobile monitoring devices (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for performing at least one remedial action in response to detecting an excess utilization of a telecommunication network by a plurality of mobile monitoring devices that is not caused by the primary function of the plurality of mobile monitoring devices (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   identifying, by a processor, an excess utilization of a telecommunication network by a plurality of mobile monitoring devices, wherein the plurality of mobile monitoring devices are of a same mobile monitoring device type, wherein the plurality of mobile monitoring devices comprises a plurality of wireless sensor devices, wherein each wireless sensor device of the plurality of wireless sensor devices is worn by a respective user of a plurality of users or is affixed to a vehicle of the respective user of the plurality of users, wherein a primary function of the plurality of mobile monitoring devices is inaccessible to control by the plurality of users, wherein the inaccessible to control comprises the plurality of users not being authorized to change any settings of the primary function of the plurality of mobile monitoring devices, and wherein the primary function of the plurality of mobile monitoring devices is associated with a collection of data from a physical environment;
   determining, by the processor, that the excess utilization is not caused by the primary function of the plurality of mobile monitoring devices; and
   performing, by the processor, at least one remedial action in response to the detecting of the excess utilization that is not caused by the primary function of the plurality of mobile monitoring devices.

2. The method of claim 1, further comprising:
   obtaining utilization metrics associated with a utilization of the telecommunication network by the plurality of mobile monitoring devices.

3. The method of claim 2, wherein the obtaining of the utilization metrics comprises:

collecting call detail records associated with the plurality of mobile monitoring devices, wherein the excess utilization is detected from the call detail records.

4. The method of claim 3, wherein each of the call detail records includes at least one of:

a connection time;

a session duration;

a data volume;

a throughput measure; or an error flag.

5. The method of claim 2, wherein the excess utilization comprises a predicted excess utilization, wherein the method further comprises:

applying an input data set comprising the utilization metrics to at least one machine learning model implemented by the processor, wherein the excess utilization is detected in accordance with at least one output of the at least one machine learning model.

6. The method of claim 5, wherein the at least one machine learning model comprises a time series prediction model.

7. The method of claim 5, wherein the input data set further comprises at least one of:

weather data of an area containing the plurality of mobile monitoring devices;

calendar data of the plurality of users associated with the area;

incident report data for the area;

event data for scheduled events in the area; or geographic landmark data in the area.

8. The method of claim 1, wherein the excess utilization comprises at least one of:

an average per-device bandwidth utilization of the plurality of mobile monitoring devices exceeding a first threshold;

an average per-device data usage of the plurality of mobile monitoring devices exceeding a second threshold;

an average number of simultaneous active sessions per-device of the plurality of mobile monitoring devices exceeding a third threshold;

an average per-device number of connection setup requests of the plurality of mobile monitoring devices exceeding a fourth threshold; or an average per-device rate of connection setup requests of the plurality of mobile monitoring devices exceeding a fifth threshold.

9. The method of claim 8, wherein at least one of: the first threshold, the second threshold, the third threshold, the fourth threshold, or the fifth threshold is a dynamic threshold that is based upon an aggregate utilization metric for a set of mobile monitoring devices that includes the plurality of mobile monitoring devices and a plurality of additional mobile monitoring devices.

10. The method of claim 1, further comprising:

obtaining a request to track a network utilization of the plurality of mobile monitoring devices, wherein the detecting of the excess utilization of the telecommunication network by the plurality of mobile monitoring devices is performed in response to the request.

11. The method of claim 10, wherein the request identifies the plurality of mobile monitoring devices.

12. The method of claim 11, wherein the request identifies the plurality of mobile monitoring devices in accordance with at least one identification factor comprising at least one of:

a device type of the plurality of mobile monitoring devices;

an owner of the plurality of mobile monitoring devices; or an entity that is authorized to receive data from the plurality of mobile monitoring devices.

13. The method of claim 11, wherein the request further includes at least one of:

a time constraint associated with the plurality of mobile monitoring devices; or a geographic constraint associated with the plurality of mobile monitoring devices.

14. The method of claim 11, wherein the request further includes at least one threshold for at least one type of excess utilization of the telecommunication network to be tracked.

15. The method of claim 1, wherein the at least one remedial action comprises at least one of:

blocking at least one of: transmit data or receive data of at least a portion of the plurality of mobile monitoring devices;

rate-limiting at least one of: the transmit data or the receive data of the at least the portion of the plurality of mobile monitoring devices; or imposing selective blocking of connection requests from the at least the portion of the plurality of mobile monitoring devices.

16. The method of claim 1, wherein the at least one remedial action comprises transmitting a report of the excess utilization of the telecommunication network to at least one of: an operator of the plurality of mobile monitoring devices or a manufacturer of the plurality of mobile monitoring devices.

17. The method of claim 16, further comprising:

receiving a request from at least one of: the operator or the manufacturer to impose at least one additional remedial action via the telecommunication network; and implementing the at least one additional remedial action in response to the request to impose at least one additional remedial action.

18. The method of claim 17, wherein the at least one additional remedial action comprises at least one of:

blocking at least one of: transmit data or receive data of at least a portion of the plurality of mobile monitoring devices;

rate-limiting at least one of: the transmit data or the receive data of the at least the portion of the plurality of mobile monitoring devices; or imposing selective blocking of connection requests from the at least the portion of the plurality of mobile monitoring devices.

19. A non-transitory computer-readable medium storing instructions which, when executed by a processing system including at least one processor, cause the processing system to perform operations, the operations comprising:

identifying an excess utilization of a telecommunication network by a plurality of mobile monitoring devices, wherein the plurality of mobile monitoring devices are of a same mobile monitoring device type, wherein the plurality of mobile monitoring devices comprises a plurality of wireless sensor devices, wherein each wireless sensor device of the plurality of wireless sensor devices is worn by a respective user of a plurality of users or is affixed to a vehicle of the respective user of the plurality of users, wherein a primary function of the plurality of mobile monitoring devices is inaccessible to control by the plurality of users, wherein the inaccessible to control comprises the plurality of users not being authorized to change any settings of the primary function of the plurality of mobile monitoring devices, and wherein the primary function of the plurality of mobile monitoring devices is associated with a collection of data from a physical environment;

determining that the excess utilization is not caused by the primary function of the plurality of mobile monitoring devices; and performing at least one remedial action in response to the detecting of the excess utilization that is not caused by the primary function of the plurality of mobile monitoring devices.

20. An apparatus comprising:

a processing system including at least one processor; and a computer-readable medium storing instructions which, when executed by the processing system, cause the processing system to perform operations, the operations comprising:

identifying an excess utilization of a telecommunication network by a plurality of mobile monitoring devices, wherein the plurality of mobile monitoring devices are of a same mobile monitoring device type, wherein the plurality of mobile monitoring devices comprises a plurality of wireless sensor devices, wherein each wireless sensor device of the plurality of wireless sensor devices is worn by a respective user of a plurality of users or is affixed to a vehicle of the respective user of the plurality of users, wherein a primary function of the plurality of mobile monitoring devices is inaccessible to control by the plurality of users, wherein the inaccessible to control comprises the plurality of users not being authorized to change any settings of the primary function of the plurality of mobile monitoring devices, and wherein the primary function of the plurality of mobile monitoring devices is associated with a collection of data from a physical environment;

determining that the excess utilization is not caused by the primary function of the plurality of mobile monitoring devices; and performing at least one remedial action in response to the detecting of the excess utilization that is not caused by the primary function of the plurality of mobile monitoring devices.

* * * * *